United States Patent
Bertrand et al.

(10) Patent No.: US 8,275,470 B2
(45) Date of Patent: Sep. 25, 2012

(54) METHOD FOR CONTROLLING A MODULAR PRODUCTION MACHINE CONSISTING OF APPLIANCES AND COMPONENTS

(75) Inventors: Eduardo Bertrand, Erlangen (DE); Klaus Hertinger, Erlangen (DE); Martin Kiesel, Poxdorf (DE)

(73) Assignee: Siemens Aktiengesellschaft, München (DE)

( * ) Notice: Subject to any disclaimer, the term of this patent is extended or adjusted under 35 U.S.C. 154(b) by 585 days.

(21) Appl. No.: 12/087,041

(22) PCT Filed: Nov. 23, 2006

(86) PCT No.: PCT/EP2006/068799
§ 371 (c)(1),
(2), (4) Date: Jun. 24, 2008

(87) PCT Pub. No.: WO2007/077055
PCT Pub. Date: Jul. 12, 2007

(65) Prior Publication Data
US 2009/0138098 A1    May 28, 2009

(30) Foreign Application Priority Data
Dec. 28, 2005    (DE) .......................... 10 2005 062 811

(51) Int. Cl.
*G06F 19/00*    (2011.01)
(52) U.S. Cl. ............................ 700/17; 700/97
(58) Field of Classification Search .............. 700/17–20, 700/97, 108–110, 86, 87, 257; 717/108, 717/174; 901/3, 45
See application file for complete search history.

(56) References Cited

U.S. PATENT DOCUMENTS

| | | | | |
|---|---|---|---|---|
| 4,698,766 A * | 10/1987 | Entwistle et al. | ............... | 700/96 |
| 5,456,023 A * | 10/1995 | Farnan | ............... | 34/270 |
| 5,687,052 A * | 11/1997 | Bennett | ............... | 361/190 |
| 6,449,624 B1 | 9/2002 | Hammack et al. | | |
| 6,668,209 B2 * | 12/2003 | Urbanek | ............... | 700/200 |
| 6,882,890 B2 * | 4/2005 | Horn et al. | ............... | 700/86 |
| 7,117,049 B2 * | 10/2006 | Horn et al. | ............... | 700/83 |
| 7,137,128 B2 * | 11/2006 | Shimada et al. | ............... | 720/601 |
| 2003/0004585 A1 * | 1/2003 | Horn et al. | ............... | 700/18 |
| 2003/0229549 A1 * | 12/2003 | Wolinsky et al. | ............... | 705/27 |

FOREIGN PATENT DOCUMENTS

| | | |
|---|---|---|
| DE | 199 59 245 A1 | 6/2001 |
| DE | 101 01 745 A1 | 8/2002 |
| EP | 1 061 423 A1 | 12/2000 |

OTHER PUBLICATIONS

Hilding Emlqvist; "A Uniform Arthitecture for distributed Automation"—Advances in Instrumentation and Control, Jan. 1991; vol. 46, Part 2; pp. 1599-1608; XP000347589; ISSN: 1054-0032; Instrument Society of America, Research Triangle Park, US.

* cited by examiner

*Primary Examiner* — Kidest Bahta

(57) ABSTRACT

Modular production machines with appliances and components, controlled by means of projects. A project is the establishment of an arrangement of appliances and modules. A plurality of machine objects is associated with the determined arrangement locations in the project. In this way, the projects have a variability in terms of different machine objects, which is enabled by an engineering system. A control system (a run-time system) can affect a corresponding selection from the options. To enable an economical control of production machines some appliances or components can be selectively replaced by other appliances or modules.

16 Claims, 1 Drawing Sheet

METHOD FOR CONTROLLING A MODULAR PRODUCTION MACHINE CONSISTING OF APPLIANCES AND COMPONENTS

CROSS REFERENCE TO RELATED APPLICATIONS

This application is the US National Stage of International Application No. PCT/EP2006/068799, filed Nov. 23, 2006 and claims the benefit thereof. The International Application claims the benefits of German application No. 10 2005 062 811.7 DE filed Dec. 28, 2005, both of the applications are incorporated by reference herein in their entirety.

FIELD OF INVENTION

The invention relates to a method for controlling a modular production machine consisting of appliances and components.

SUMMARY OF INVENTION

In an engineering system an arrangement of appliances and components is defined which forms a project wherein, in the project, specific arrangement locations are assigned at least one machine object with control information for a respective appliance or component, and wherein the project is directed to a control system which, on the basis of the machine objects, can activate a production machine corresponding to the project with the machine objects. The invention thus involves the conventional use of an engineering system with associated control system (runtime system) while using projects.

Within the framework of the above conceptions "arrangement location" is to be understood as the arrangement implying a sequence, with the location reflecting the respective location of the sequence. The sequence does not have to have its counterpart in the production machine, but a specific array of machine objects involving the control side can be involved, which relates to a more complicated arrangement of the actual appliances and components than a linear arrangement. Conventionally the slots which can be given sequence numbers are used for interfaces; the arrangement can then reflect the order of the slots, by which the "arrangement location" mentioned above is defined.

The automation of production machines which is undertaken in accordance with the building block principle is associated with various difficulties.

The maximum capacity stage of a machine type is defined with a basic form of embodiment, with machine objects to be used as additions and machine objects to be used as replacements.

In reality a compromise must always be found between the project planning of different options which the modular series construction of a production machine, and the restricted option of administering a plurality of data.

A previous approach followed is based on planning a fictitious maximum configuration for the project which includes all embodiment variants. This fictitious maximum configuration has the weakness that the resources will not be well used. For example memory is overloaded with large amounts of data which is not needed at all. Data is transferred over field busses which are dimensioned too large, since the starting point is always the data for the entire fictitious maximum configuration even if all of such data will not be used in detail.

It is also only insufficiently detected that some machine objects can be replaced by other machine objects. Within the framework of this fictitious machine configuration additive machine objects are instead able to be handled as options within the framework of the configuration. The fictitious maximum configuration discovers its weaknesses if machine objects have to be frequently replaced in everyday service during machine repairs.

The approach which has also been adopted in the prior art is that of maintaining alternate project variants and of using alternate projects depending on the level of configuration. The methodology has turned out to have the disadvantage of only enabling versions and variants to be managed with great difficulty, since carry-over parts occur in the different projects. If something changes in a specific machine object, a plurality of projects must theoretically be changed.

There has finally also been a move to handling variants outside the engineering tools using special software tools, with external control interfaces of the engineering tools playing a role during the appropriate activation. In these variants the engineering system must always be available at the machine. These system solutions are thus costly.

An object of the invention is to further develop project planning such that in particular configuration variants in which only individual machine objects are replaced can be more easily controlled.

The object is achieved by a method in accordance with an independent claim, an engineering system and a runtime system in accordance with further independent claims.

Thus, in accordance with the invention in the engineering system a number of different machine objects are assigned at least one arrangement location in the project, so that the control system can activate production machines with the aid of the project in which at the site corresponding to this arrangement location an appliance/component corresponding to one of the different machine objects is optionally used.

The invention thus gives a new meaning to the term project. A project is no longer a fixed arrangement of appliances and components, but is an arrangement at the arrangement locations of which individual machine objects can be variably classified. Arrangement locations can correspond to real slots in a component carrier or can be components in an automation network. This does not depart from the principle however that, within the framework of the engineering system, an appliance/component arrangement is defined as a project. The user is still able to move graphical objects around at a graphical interface in order to arrange them in a particular way. The graphical user interface provides an additional option however of arranging a number of graphical objects at the same arrangement location, i.e. of not having a slot occupied uniquely by a specific appliance or a specific component, but of allowing a choice between different appliances and/or components at a specific slot.

In a preferred embodiment of invention attributes are assigned to the machine objects at least one arrangement location which reflect the role of the machine objects in the project and/or which reflect the relationship of the assigned appliances and components to appliances and components at another arrangement location.

In the one variant the attributes can define whether the machine objects concerned are machine objects of a basic version or whether they are additive machine modules which are represented by the objects. By the use of the attributes the invention thus facilitates the administration of additive machine modules which do not even have to be occupied. In the second variant consistency rule for reliable configuration can be stored with the aid of the attributes. For example it can be possible for the presence of a specific appliance or of a specific component at an arrangement location to exclude a specific, optionally available appliance or an optionally available component being selected. In this respect the attribute can define which combinations in actual arrangements are really possible are which are permitted. The optional provision of a number of machine objects at different arrangement locations of the project theoretically allows such a plurality of options that it goes without saying that the entire plurality of corresponding combinations of the modules (appliances and components) is not possible or permissible in reality.

Preferably instructions which can be output by the control system are stored (with the attributes) in the project. Instructions are instructions to the user, who has to note said instructions especially when dealing with the additive machine objects and the replacement machine objects. This applies to the structure of the modular production machines, if it is checked with the aid of the control system whether this corresponds to the configuration made possible by the project, and this applies when the control system on which the project is used is connected to a real production machine, if project and production machine still have to be matched to one another. The instruction can for example also include a request being made to the operator as to which appliances are connected, so that the control system (the runtime system) can select specific machine objects from the alternate machine objects in the project at the various arrangement locations.

In a preferred embodiment the control system checks, on connection to a production machine, whether the appliances and components of the production machine are able to be controlled in their entirety with the aid of the project. This checking can for example include consistency checking, as to whether a permissible configuration is involved, which is made possible by the variants of the machine objects at the arrangement location in the project on the one hand and on the other hand, is then deemed permissible by the attributes.

The preferred embodiment is based on a production machine which has already been set up. The control can also operate interactively when the production machine is first being set up and in this case for example outputs to an operator information relating to possible configurations, which concerns the parts of the appliance and the components still to be set up. The invention also relates, as mentioned above, to an engineering system for forming a project for the activation of a modular production machine consisting of appliances and components, with the project being constructed as appliance and component arrangements, at the arrangement locations of which at least one machine object with control system arrangements for one appliance or component is assigned in each case, which is characterized in that at least one arrangement location is assigned a plurality of machine objects. In other words the invention also relates to an engineering system, as is employed in the inventive method, i.e. which allows the use of the said innovative projects with a plurality of machine objects per arrangement location. The novelty can exist in the programming of the engineering system when using known components, i.e. in a novel computer program which is designed for programming an engineering system, and which can administer projects accordingly at the arrangement locations of which a plurality of machine objects is provided.

The invention also relates to a control system (runtime system), which obtains from a project control commands for the activation of a modular production machine consisting of appliances and components, and which is characterized in that it is designed to use projects which are defined from appliance and component arrangements, with at least one arrangement location being assigned a plurality of machine objects and with the runtime system being designed, as a result of information about the production machine, to make a choice from the plurality of machine objects. The information can be obtained in this case, merely by connecting the system to the production machine, by reading out corresponding identification information or can also be information entered by a user.

The runtime system can be a conventional runtime system, which is programmed accordingly for use of the inventive projects. The invention thus also includes a corresponding computer program product.

BRIEF DESCRIPTION OF THE DRAWINGS

The invention will now be explained in more detail below with reference to the drawing, with FIG. 1 showing a schematic of a project as created by an inventive engineering system, and FIG. 2 showing a schematic of the project from FIG. 1, as used in an inventive runtime system.

DETAILED DESCRIPTION OF INVENTION

Figure 1:
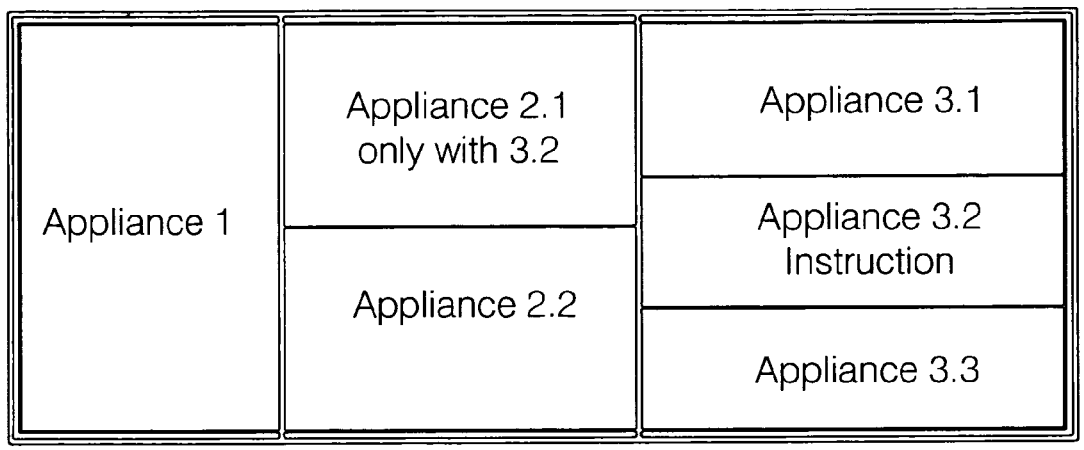

In an engineering system it is possible to form a project which is illustrated in FIG. 1 and is shown in this figure as a box with a double outline. The project is nothing other than an arrangement of appliances and components, with the appliances and components being represented by corresponding machine objects. The arrangement naturally consists of different arrangement locations, which are separated from each other in FIG. 1 by a solid line. The first arrangement location is only assigned to the machine object for appliance 1. The second arrangement location is assigned two different machine objects, namely for appliance 2.1 and for appliance 2.2. Finally the third arrangement location is assigned machine objects for three different appliances, the appliances 3.1, 3.2 and 3.3.

The project differs from projects of the prior art in that two arrangement locations are assigned a plurality of machine objects. With projects in accordance with the prior art each arrangement location appears as arrangement location 1, i.e. only a single appliance is assigned to it.

The machine object for the appliance 2.1 is assigned an attribute in this case. The words "only with 3.2" mean that appliance 2.1 in a real may only be used in a real production machine if appliance 3.2 is used at the same time. The selection is restricted by this attribute. While there is a choice between the three appliances 3.1, 3.2 and 3.3 when the appliance 2.2 is used, the choice of the appliance 2.1 defines that no choice can be made at the third arrangement location.

The project further includes an instruction which is linked to the machine object for the appliance 3.2. The instruction can be used in a runtime system. For example the instruction is needed when the production machine is first being included in the structure. If a site which corresponds to the third arrangement location (a slot), is occupied before the site which corresponds to the second arrangement location, i.e. one of the appliances 3.1, 3.2 and 3.3, is selected, before a choice is made between appliance 2.1 and appliance 2.2, the attribute that the appliance 2.1 is only to be combined with the appliance 3.2 might possibly be lost. Therefore, when one of the appliances 3.1, 3.2 and 3.3 is selected, attention is already paid to the fact that in the subsequent selection the appliance 2.1 can only be selected if the appliance 3.2 has been selected beforehand. The term, "instruction" in this case stands for a plurality of possibilities. For example error messages can be provided for incorrect insertion of appliances in the slots and support instructions can be given to the personnel who are assembling the production machine.

The attributes can also be more versatile than what is merely depicted schematically in FIG. 1. For example specific appliances can be characterized as being associated with a basic form of embodiment and other appliances as facultative. For example one attribute for the machine objects for appliance 1, appliance 2.1 and appliance 2.2 could be that these appliances belong to a basic form of embodiment, while an attribute for the appliances 3.1, 3.2 and 3.3 could appear so that these count as an additional option, with the additional restriction already mentioned applying that the appliance 3.2 must be selected if the appliance 2.1 is selected, if any one of appliances 3.1, 3.2 and 3.3 is selected.

Figure 2:
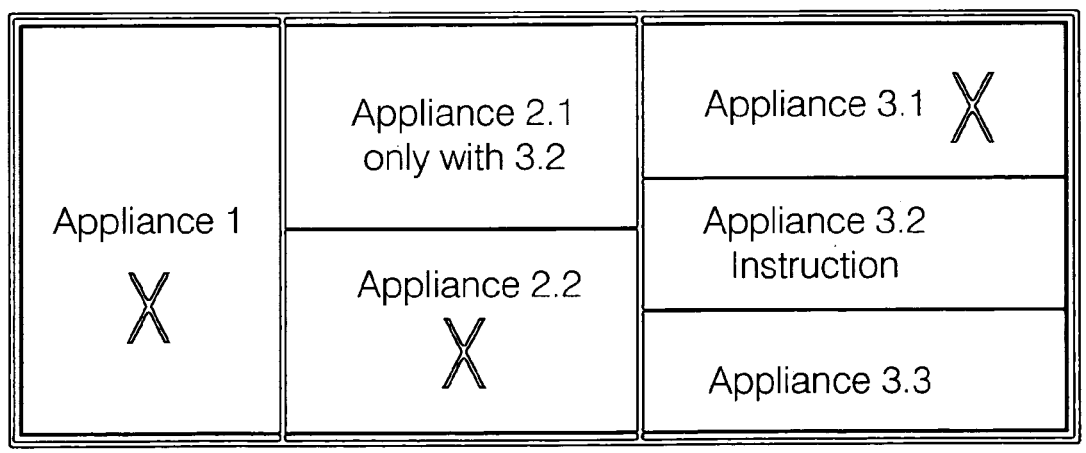

FIG. 2 now illustrates what the runtime system (control system) makes from the project. The runtime system is certainly used to control a specific production machine of modular construction. Naturally this cannot cover all variants made possible by the project. Thus for example the production machine to be controlled consists of the appliance 1, the appliance 2.2 and the appliance 3.1. The crosses in FIG. 2 illustrate that these machine objects have now been subject to selection which the runtime system undertakes on the basis of the information about the actual production machine. The runtime system checks in this case whether the selection involved is permissible. Since the appliance 2.1 has not been selected it is of no consequence that the appliance 3.1 has been selected, this may namely be combined with the appliance 2.2 and also with appliance 1. Thus a valid selection is involved overall, and the control system will issue a corresponding message and subsequently be able to activate the production machine with the aid of the project.

The described type of project, in which an arrangement location is assigned a plurality of machine objects, thus allows in particular alternate options between different appliances (and components) to be handled in the optimum technical manner. Unlike with the use of a plurality off projects, in which each arrangement location is assigned only one machine object which are designed to represent alternatives, maintenance of the data is facilitated here. If a new variant of the appliance 2.2 comes onto the market it is merely a matter of changing only the machine object for the appliance 2.2 in the project, and not in a plurality of projects. The fact that it is (see FIG. 2) the runtime system which makes a selection from the machine objects makes the inventive project economical in its use of resources, which affects memory locations and transfers via data buses.

The type of inventive project allows a plurality of options, which relates to the differences between the appliances 2.1 and 2.2 or 3.1, 3.2 and 3.3.

For example objects which replace each other can be involved having the same machine-readable product designation (MLFB). The relationship can also be less than this; it can involve the same class of appliances (e.g. power packs, control sections etc. seen in very general terms). Finally just the control scheme can be the same, for example with mechatronic objects. The relationship can however be designed even more narrowly, for example there can be a requirement for the nominal current densities for power packs to be the same etc.

Specific rules can apply for the replacement of objects, which can also be held in the above-mentioned attributes. For example it can be possible for some appliances (e.g. appliance 3.2) to merely temporarily replace the related appliances 3.1 and 3.2, and to do so in the event of the production machine undergoing maintenance. The interchange of related components can be permitted, for example between appliance 2.1 and appliance 3.2. There are many options for how objects which replace each other come into play within the framework of the invention. The important aspect is that the project already provides for the replacement of the objects, as is made possible by the present invention.

The invention claimed is:

1. A method for controlling a modular production machine having appliances and components; comprising:
    defining an appliance and component arrangement in a engineering system which forms a project;
    assigning specific arrangement locations in the project at least one machine object with control system information for an appliance or a component in each case;
    directing the appliance to a control system, wherein the control system controls the production machine based upon the machine objects, wherein the production machine corresponds to the project with the machine objects; and
    assigning at least one arrangement location in the project a plurality of different machine objects, such that the control system provides a control of the production machines based upon the project,
    wherein the at least one arrangement location is not occupied uniquely by a specific appliance or a specific component but allows a choice between different appliances and/or components at the at least one arrangement location.

2. The method as claimed in claim 1, wherein the controlled production machines are at a site corresponding to the arrangement locations.

3. The method as claimed in claim 1, wherein an appliance and/or component is used for the production machine which corresponds to the machine objects for the respective setup location.

4. The method as claimed in claim 3, wherein the machine object is assigned at least one arrangement location attribute which reflects a role of the machine object in the project or the relationship of the assigned appliance and component to appliances and components at another arrangement location.

5. The method as claimed in claim 2, wherein instructions from the control system are stored in the project.

6. The method as claimed in claim 3, wherein instructions from the control system are stored in the project.

7. The method as claimed in claim 4, wherein instructions from the control system are stored in the project.

8. The method as claimed in claim 1, wherein the control system checks on connection to the production machine whether the appliances and components of the production machine are able to be controlled in their entirety with the aid of the project.

9. The method as claimed in claim 2, wherein the control system checks on connection to the production machine whether the appliances and components of the production machine are able to be controlled in their entirety with the aid of the project.

10. The method as claimed in claim 3, wherein the control system checks on connection to the production machine whether the appliances and components of the production machine are able to be controlled in their entirety with the aid of the project.

11. The method as claimed in claim 4, wherein the control system checks on connection to the production machine whether the appliances and components of the production machine are able to be controlled in their entirety with the aid of the project.

12. The method as claimed in claim 5, wherein the control system checks on connection to the production machine whether the appliances and components of the production machine are able to be controlled in their entirety with the aid of the project.

13. The method as claimed in claim 6, wherein the control system checks on connection to the production machine whether the appliances and components of the production machine are able to be controlled in their entirety with the aid of the project.

14. The method as claimed in claim 7, wherein the control system checks on connection to the production machine whether the appliances and components of the production machine are able to be controlled in their entirety with the aid of the project.

15. An engineering system for creating a project for an activation of a modular production machine having appliances and components, comprising:
   a project embodied as an arrangement of appliances and components,
   wherein at arrangement locations of which at least one machine object with control information for an appliance or a component is assigned in each case,
   wherein at least one arrangement location is assigned a plurality of machine objects, wherein the machine object is assigned at least one arrangement location attribute which reflects a role of the machine object in the project or the relationship of the assigned appliance and component to appliances and components at another arrangement location; and
   wherein the at least one arrangement location is not occupied uniquely by a specific appliance or a specific component but allows a choice between different appliances and/or components at the at least one arrangement location.

16. A runtime system for a production machine, comprising:
   providing a project to obtain control commands from the project to control the production machine,
   wherein the production machine is modular configured having appliances and components,
   wherein the projects are defined as an arrangement of appliances and components, with at least one arrangement location being assigned a plurality of machine objects, with the runtime system being designed to make a choice from the plurality of machine objects based on information about the production machine, wherein the machine object is assigned at least one arrangement location attribute which reflects a role of the machine object in the project or the relationship of the assigned appliance and component to appliances and components at another arrangement location; and
   wherein the at least one arrangement location is not occupied uniquely by a specific appliance or a specific component but allows a choice between different appliances and/or components at the at least one arrangement location.

* * * * *